Nov. 14, 1939.  R. LEWIS ET AL  2,179,726
EJECTING TRUCK
Filed Nov. 19, 1937  2 Sheets-Sheet 2
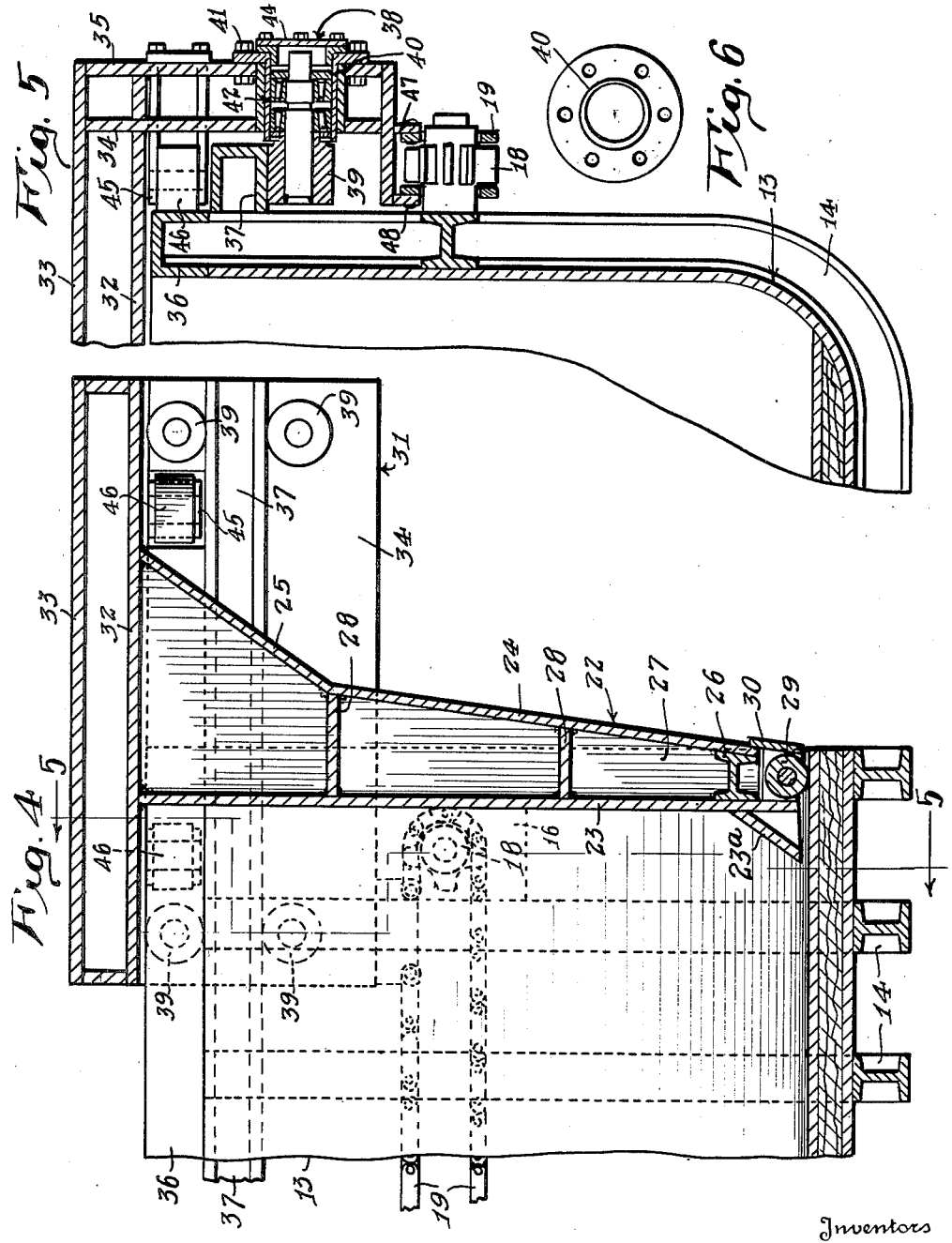
Inventors
Raymond Lewis
Forest M. Bodenhamer
By Lyon & Lyon
Attorneys Patented Nov. 14, 1939

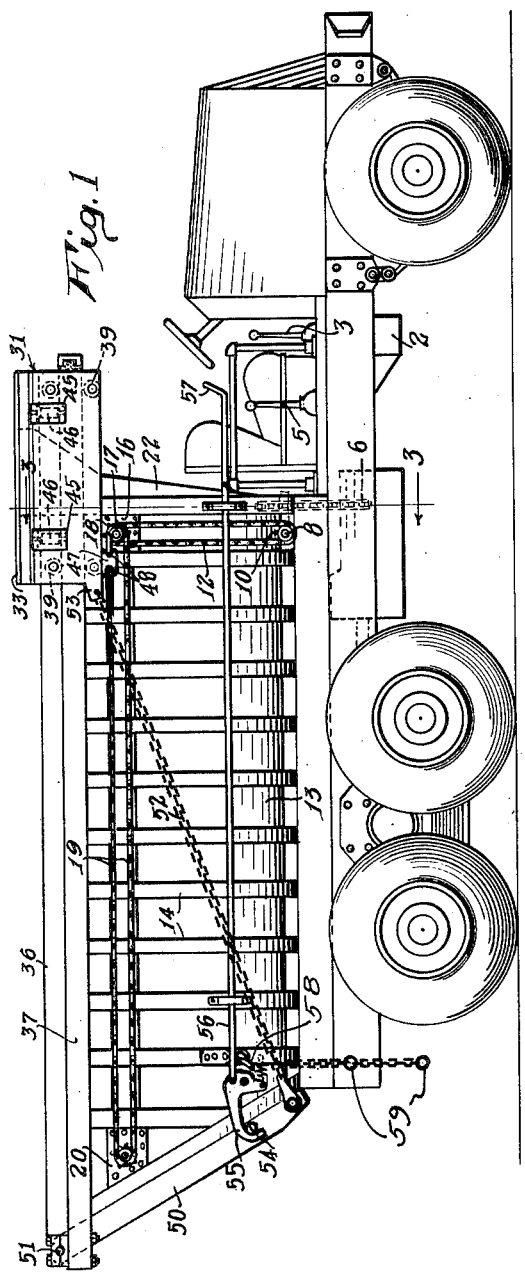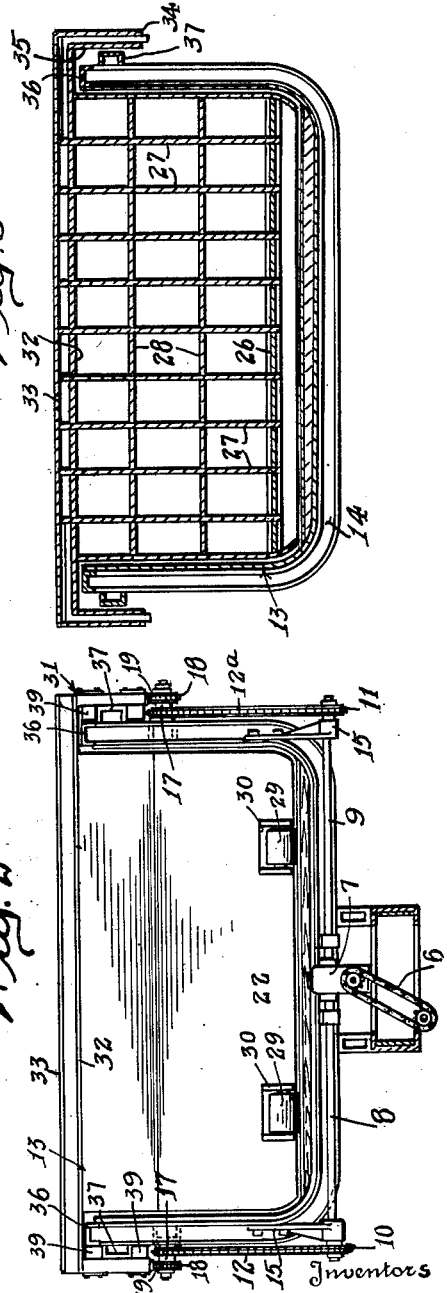

2,179,726

UNITED STATES PATENT OFFICE 2,179,726

EJECTING TRUCK

Raymond Lewis, Los Angeles, and Forest M. Bodenhamer, Oakland, Calif.

Application November 19, 1937, Serial No. 175,458

8 Claims. (Cl. 214—82)

This invention relates to a truck body, wherein a bulkhead moves longitudinally from the forward to the rear end of the truck body to eject the contents thereof out through the rear end of the truck body. The movable bulkhead is actuated by power furnished from the motor of the truck.

In truck bodies of this type, particularly when constructed in large sizes, it is difficult to eliminate torsional strains on the movable bulkhead. Heretofore, various attempts have been made to provide the bulkhead with sufficient movable supports or rollers in order to inhibit the placing of a torsional strain upon the bulkhead. In moving large volumes of dirt by the movable bulkhead, it is not found satisfactory to rely on the rollers or other movable supports to relieve the bulkhead from torsional strains.

The principal object of the present invention is, therefore, to provide a truck with a movable bulkhead of suitable construction to be self-resistant to torsional strains. The movable bulkhead of the truck of the present invention is made of box-like structure, suitably reinforced so as to be able to sustain all torsional strains to be placed thereon. The truck of the present invention also includes a suitable carriage for supporting and moving the bulkhead in operation, provided with bearings, preferably of roller type, to restrain the bulkhead to move longitudinally while avoiding tipping thereof.

The truck of the present invention is also provided with suitable means for driving the bulkhead from both sides thereof and a suitable mechanism for actuating the end-gate of the truck.

A further object of the present invention is to provide a truck of the above type with a construction or shape of body desired to permit a minimum movement of the bulkhead to eject a maximum of load from the truck.

In accordance with the present invention, the body of the truck is provided with a rear end, which is slanting upwardly, or the bottom is made relatively short relative to the top thereof and the movable bulkhead driven only over the length of the bottom of the body. Associated with the body there is provided a rear gate, which is pivoted at the upper end of the body and detachably latched at its lower end. By this construction through the unlatching of the rear gate a very substantial portion of the load may be discharged without moving the bulkhead and the form of the body greatly facilitates the discharge of the remaining load. The rear gate is also provided with means by which the same may be latched in various positions defining different sizes of openings which will regulate the discharge of the load from the truck. In combination with the type of rear gate mechanism utilized the movable bulkhead provides a means by which the contents of the truck may be discharged in different regulated streams during the movement of the truck, so that the load may be uniformly distributed in various desired manners.

Various further objects and advantages of the truck of the present invention will be apparent from a description of the preferred form or example of a truck embodying the invention. For this purpose, there is hereinafter described a preferred form or example of an ejecting truck embodying the present invention.

In the drawings:

Figure 1 is an elevation of the truck.

Figure 2 is an elevation of the front end of the body.

Figure 3 is a section on the line 3—3 of Figure 1.

Figure 4 is an enlarged fragmentary elevation showing in particular the movable bulkhead.

Figure 5 is a fragmentary vertical section on the line 5—5 of Figure 4.

Figure 6 is an end view of the eccentric roller adjusting means.

Referring to the drawings, the truck is shown as having the truck motor driving the usual transmission 2, this transmission being operated by the usual gear shift lever 3. The transmission 2 is shown as preferably provided with the usual gears and suitable shifting means 5 to provide a power take-off from the transmission for operating the ejecting truck.

While the truck body of the present invention may be operated by a motor separate from the truck motor, it is preferable that the same motor be used. The truck of the present invention through the use of the take-off means shown is enabled to move forwardly at different speeds while the contents of the truck body are being ejected from the truck. This constitutes an important feature of the present invention as it permits the truck to be utilized for spreading the load in the act of unloading the same. The take-off from the transmission 2 is preferably moved by a chain drive 6 which leads to a speed reducer 7. The speed reducer 7 has shafts 8 and 9, the ends of which are provided with sprockets 10 and 11 of a chain drive 12 and 12a disposed at the sides of the truck body. The body 13 of the truck may be of any suitable design or shape having the front and rear ends open. Thus, the body 13 of the truck forms the bottom and sidewalls of the truck body only. The body is shown as preferably reinforced with I-beams 14, although it is to be understood that any preferred construction may be used. Suitable brackets 15 are provided on the body for providing bearings for the drive shafts 8 and 9, and the sides of the truck body are provided with further brackets 16, which mount hubs 17, which have sprockets rigid thereon receiving the vertical chains 12 and also sprockets 18 for supporting on each side of the truck a longitudinal chain 19. At the rear end of the truck body brackets 20 are provided for supporting a hub mounting a rear sprocket for each longitudinal chain 19.

The forward end of the truck body is shown as closed by a movable bulkhead 22. The bulkhead 22 is constructed of a box construction with sufficient reinforcements so as to be self-resisting to any torsional strains. For this purpose, the bulkhead is shown as on its rear side provided with a substantially vertical plate 23 and on its forward side with a plate 24 diverging upwardly and then bent forwardly, as indicated at 25. At the lower end of the bulkhead there is provided a transverse brace 26, indicated as preferably formed by an I-beam. Above the I-beam 26 there is provided cross bracing consisting of vertical plates 27 and horizontal plates 28 welded to the front plate 24, and likewise welded in places at least to the vertical plate 23. At its lower end, the rear plate 23 of the bulkhead is provided with a rearwardly inclined cutting member 23a adapted to assist in cutting the load from the truck body and so constructed as to inhibit bending back the lower end of the plate 23 of the bulkhead. By this construction, when in practice the cutting member 23a becomes worn it may be replaced by a like member welded in place thereof. The bulkhead is provided with suitable rollers 29 mounted on shafts supported by brackets 30. These rollers are positioned at different points, providing rolling contact between the bulkhead and bottom of the body and likewise between the bulkhead and sides of the body.

At its upper end the bulkhead is welded to a carriage 31. The carriage 31 consists of the lower plate 32 and the upper plates 33. The lower plates 32 are welded to the plates 23 and 25 of the bulkhead and the vertical bracing for the bulkhead crosses the plates 32 and extends to and is welded to the top plate 33 of the carriage. The carriage end plates 32 and 33 thereof extend over the sides of the truck body and are there welded to the depending plates 34 and 35. The plates 34 and 35 extend below and are spaced somewhat from the upper edge of the truck body and serve to support this roller means for operating between the carriage and sidewalls of the body for guiding the motion of the gate in operation. For this purpose, the upper end of the body is formed by the channel iron 36 and below the channel iron 36 the body is provided with rails 37. The plates 34 and 35 of the carriage receiver roll assemblies 38 mounting rollers 39, which are in engagement with either the upper or lower surfaces of the rails 37.

In the particular form of the truck body shown the carriage is indicated as mounting four of the roller assemblies on each side of the truck, two of the roller assemblies engaging the upper side of the roller, and two the lower side. It is, however, unnecessary to use all of the rollers shown, as satisfactory operation can be attained by using only two rollers on each side of the carriage; for example, on one side of the carriage employing one of the forwardly positioned rollers engaging the top of the truck and one of the rearwardly positioned rollers engaging the bottom of the truck, using at the other side an opposite arrangement, i. e., a roller at the forward end engaging at the bottom of the truck and a roller at the rear engaging the top of the truck.

All of the roller assemblies are of like construction and one only thereof will be described. A fixed bushing is inserted in a hole in the plates 34 and 35, and within this bushing is fitted an interior bushing 40 having a flange thereon which is bolted, as indicated at 41, to the plate 35. The interior bushing 40 is bored on its inner face eccentrically with respect to the center of the fixed bushing, so that as the bushing 40 is revolved within the fixed bushing the axis thereof may be moved upwardly or downwardly. Within the bushing 40 there is a roller bearing mounting 42 for a shaft carrying the rollers 39. The rollers 39 engage the track 37. By changing the bolts 41 the rollers 39 may have its contact with the rail 37 suitably adjusted. 44 indicates a suitable cap plate bolted to cover the roller bearings 42.

The carriage also mounts a pair of brackets 45 on each side of the truck body which support vertically mounted rollers 46 bearing aganst the channel 36 at the top of the body, which serve the purpose of holding the sides of the body from bulging outwardly under a load. The positions of such rollers may be adjusted by suitable shims under the brackets 45.

The depending plates 34 and 35 of the carriage support on each side of the truck a bracket 47 which provides pins 48, to which are attached the ends of the chain 19, whereby the motion of the chain 19 will cause the carriage and bulkhead to be driven longitudinally of the truck body to eject the contents as desired.

The truck is shown as preferably provided with an end-gate 50 pivoted as indicated at 51 to its upper end with the lower end adapted to swing open. The lower end of the truck is shown as connected by a cable 52 to the carriage of the bulkhead, as indicated at 53, so that it may be closed under power when the bulkhead is moved to the forward end of the truck.

An important feature of the present invention resides in the use of a truck body shaped so that the end gate 50 in closed position tilts outwardly, so that when the gate is released a considerable portion of the contents of the body may be expelled without the necessity of moving the bulkhead. By this means, a larger volume of material may be dumped from the truck body with the same motion of the bulkhead. The end-gate 50 is also preferably provided with suitable means for latching the same, such as the pin 54, adapted to be held by a toggle latch 55. The toggle latch 55 is shown as operable by a rod 56 extending to a lever 57 at the driver's seat.

A further feature of the present invention is the means utilized by which the end gate 50 may be latched in a partially open condition, so that the operation of the bulkhead may be caused to expel the contents of the truck at a regulated rate and spread the same. For this purpose, the body of the truck is indicated as provided with hooks 58 adapted to receive any one of a number of rings 59 on a chain attached to the end gate 50. In this manner, the size of the opening formed by releasing the end gate 50 may be controlled with the result that only a portion of the contents of the truck above the end gate will be expelled upon release of the end gate and the entire load may then be forced from the truck body in regulated quantities.

While the particular form of ejecting truck herein described is well adapted to carry out the objects of the invention, it is to be understood that various modifications and changes therein may be made without departing from the invention, and the invention includes all such modifications and changes as come within the scope of the appended claims.

We claim:

1. An ejecting truck, comprising a body having an upwardly slanting rear end and a rear gate therefor pivoted to the top so that a portion of the contents of the body may be expelled by releasing of said rear gate, the body being provided with tracks, a carriage mounted on said tracks for longitudinal motion relative to said body, and a bulkhead rigid with said carriage and having a box construction reinforced to be self-resistant to torsional strains.

2. An ejecting truck, comprising a body having an upwardly slanting rear end and a rear gate pivoted at its upper end to said body and adapted to be opened to expel a portion of the contents of said body, a bulkhead movable within said body to expel the remaining portion, said bulkhead having a box construction reinforced to be self-resistant to torsional strains, a carriage rigidly united with said bulkhead for straddling the top of said body, and track engaging rollers provided by said carriage for guiding the same in operation.

3. An ejecting truck, comprising a body having an upwardly slanting rear end and a rear gate pivoted at its upper end to said body and adapted to be opened to expel a portion of the contents of said body, a bulkhead movable within said body to expel the remaining portion, said bulkhead having a box construction reinforced to be self-resistant to torsional strains, a carriage rigidly united with said bulkhead for straddling the top of said body, and track engaging rollers provided by said carriage for guiding the same in operation, said bulkhead having rollers contacting the inner surface of the body.

4. An ejecting truck, comprising a body having an upwardly slanting rear end and a rear gate pivoted at its upper end to said body and adapted to be opened to expel a portion of the contents of said body, a bulkhead movable within said body to expel the remaining portion, said bulkhead having a box construction reinforced to be self-resistant to torsional strains, a carriage rigidly united with said bulkhead for straddling the top of said body, and track engaging rollers provided by said carriage for guiding the same in operation, the rollers of said carriage having eccentric mountings to permit the proper adjustment thereof relative to said track.

5. An ejecting truck, comprising a body provided with tracks exterior of the load carrying space of the body, a box construction carriage straddling the body and having rollers engaging said track to inhibit vertical movement or tipping of said carriage while guiding the carriage to move longitudinally of the truck body, said carriage having roller means engaging the sides of said body to inhibit spreading of the same under load, and a bulkhead of box construction rigidly connected with said carriage and movable within said body in load ejecting operations, the body of said truck having its rear end extending in a slant upwardly and provided with a rear gate adapted to be opened to eject a portion of the load of the body whereby to limit the essential motion of the bulkhead in load ejecting operations.

6. An ejecting truck, comprising a body, a bulkhead moving longitudinally with respect to the body, a carriage for said bulkhead straddling the body and having rollers engaging the tracks mounted on the outer sides of said body, said rollers being disposed vertically and horizontally apart so as to inhibit both vertical movement and tilting of the carriage and bulkhead, said rollers having eccentrically mounted roller bearings the eccentricity of which is adjustable to tighten the same with respect to said tracks.

7. An ejecting truck, comprising a body, a bulkhead moving longitudinally with respect to the body, a carriage for said bulkhead straddling the body and having rollers engaging the tracks mounted on the outer sides of said body, said rollers being disposed vertically and horizontally apart so as to inhibit both vertical movement and tilting of the carriage and bulkhead, said rollers having eccentrically mounted roller bearings the eccentricity of which is adjustable to tighten the same with respect to said tracks, and chain drives engaging said carriage at each side of the truck body.

8. An ejecting truck, comprising a body, a bulkhead moving longitudinally with respect to the body, a carriage for said bulkhead straddling the body and having rollers engaging the tracks mounted on the outer sides of said body, said rollers being disposed vertically and horizontally apart so as to inhibit both vertical movement and tilting of the carriage and bulkhead, said rollers having eccentrically mounted roller bearings the eccentricity of which is adjustable to tighten the same with respect to said tracks, the carriage and bulkhead having a braced box construction formed to render the same a rigid unit self resistant to torsional strains.

RAYMOND LEWIS.
FOREST M. BODENHAMER.